(12) United States Patent
Ikawa et al.

(10) Patent No.: US 9,720,904 B2
(45) Date of Patent: *Aug. 1, 2017

(54) GENERATING TRAINING DATA FOR DISAMBIGUATION

(71) Applicant: International Business Machines Corporation, Armonk, NY (US)

(72) Inventors: Yohei Ikawa, Tokyo (JP); Akiko Suzuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,636

(22) Filed: Nov. 30, 2015

(65) Prior Publication Data
US 2016/0085740 A1    Mar. 24, 2016

Related U.S. Application Data

(63) Continuation of application No. 14/820,995, filed on Aug. 7, 2015, now Pat. No. 9,483,462.

(30) Foreign Application Priority Data

Aug. 19, 2014  (JP) .................................. 2014-166695

(51) Int. Cl.
G06F 17/20  (2006.01)
G06F 17/27  (2006.01)
G10L 15/06  (2013.01)

(52) U.S. Cl.
CPC ........ *G06F 17/277* (2013.01); *G06F 17/2705* (2013.01); *G06F 17/2785* (2013.01); *G10L 15/063* (2013.01)

(58) Field of Classification Search
CPC ...... G06F 17/20; G06F 17/21; G06F 17/2282; G06F 17/27; G06F 17/2705;
(Continued)

(56) References Cited

U.S. PATENT DOCUMENTS

2005/0091320 A1*  4/2005  Kirsch .................... H04L 51/12
                                              709/206
2013/0238594 A1*  9/2013  Hong ................ G06F 17/30867
                                              707/710

(Continued)

OTHER PUBLICATIONS

List of IBM Patents or Patent Applications Treated as Related; (Appendix P), Filed Jan. 25, 2016; 2 pages.

(Continued)

*Primary Examiner* — Qi Han
(74) *Attorney, Agent, or Firm* — Cantor Colburn LLP; Keivan Razavi

(57) ABSTRACT

A method for generating training data for disambiguation of an entity comprising a word or word string related to a topic to be analyzed includes acquiring sent messages by a user, each including at least one entity in a set of entities; organizing the messages and acquiring sets, each containing messages sent by each user; identifying a set of messages including different entities, greater than or equal to a first threshold value, and identifying a user corresponding to the identified set as a hot user; receiving an instruction indicating an object entity to be disambiguated; determining a likelihood of co-occurrence of each keyword and the object entity in sets of messages sent by hot users; and determining training data for the object entity on the basis of the likelihood of co-occurrence of each keyword and the object entity in the sets of messages sent by the hot users.

13 Claims, 6 Drawing Sheets

(58) Field of Classification Search
CPC .............. G06F 17/2715; G06F 17/2725; G06F 17/2755; G06F 17/2765; G06F 17/278; G06F 17/2818
USPC .......................................... 704/9, 1, 4, 7, 10
See application file for complete search history.

(56) References Cited

U.S. PATENT DOCUMENTS

| | | | |
|---|---|---|---|
| 2014/0025706 A1* | 1/2014 | Barve | G06F 17/30522 707/771 |
| 2015/0205858 A1* | 7/2015 | Xie | G06Q 50/01 707/755 |

OTHER PUBLICATIONS

Yohei Ikawa, et al., "Generating Training Data for Disambiguation", U.S. Appl. No. 14/820,995, filed Aug. 7, 2015, 2015.

\* cited by examiner

FIG. 6

| KEYWORD EXAMPLE | P/N SCORE | MEANING IN ACTUAL MESSAGE |
|---|---|---|
| mick | 0 | RELATED TO MUSIC (SINGER NAME) |
| mail | 0 | RELATED TO RACEHORSE (HORSE NAME) |
| jazz | 0.167315 | RELATED TO MUSIC |
| guitar | 0 | RELATED TO MUSICAL INSTRUMENT (INSTRUMENT MODEL NAME) |
| base | 0 | RELATED TO MUSICAL INSTRUMENT |
| type | 8.236219 | RELATED TO TOKYO MOTOR SHOW (CAR MODEL NAME) |
| motorshow | 10.50965 | RELATED TO TOKYO MOTOR SHOW |
| coupe | 7.958113 | RELATED TO TOKYO MOTOR SHOW (CAR MODEL NAME) |
| live | 0 | RELATED TO MUSIC |
| animal | 0 | JAGUAR (ANIMAL) |

GENERATING TRAINING DATA FOR DISAMBIGUATION

PRIORITY

This application is a continuation of and claims priority from U.S. patent application Ser. No. 14/820,995, filed on Aug. 7, 2015, entitled "GENERATING TRAINING DATA FOR DISAMBIGUATION," which in turn claims priority from the Japanese patent application JP 2014-16695 filed on Aug. 19, 2014, the entire contents of both these applications are incorporated herein by reference.

BACKGROUND

The present invention relates to a technique for automatically generating training data for disambiguation of a word or word string (hereinafter referred to as "entity") related to a topic to be analyzed.

Analyzing users' voices on major spots (e.g., sightseeing spots) of a city and on an event (e.g., motor show) is important for the local government and the event organizer in understanding reputations of, and needs for, the city and the event. To collect users' voices for analysis, the use of social media has been considered in recent years. A social media tool, particularly microblogging, has more immediacy than traditional blogging. Therefore, what users feel on event sites and sightseeing spots is expected to be more directly reflected in social media messages.

Messages related to a topic (e.g., city or event) to be analyzed can be collected from social media sites by pre-defining a set of entities related to the topic and extracting messages including at least one entity contained in the set. However, if any of the entities has ambiguity, the messages collected by the method described above may include those unrelated to the topic. Therefore, it is necessary to disambiguate the entity and eliminate messages unrelated to the topic.

Many of conventional semantic disambiguation algorithms have been based on supervised learning using a tagged corpus (see, e.g., A. Davis, et al., "Named Entity Disambiguation in Streaming Data." Proceedings of the 50th Annual Meeting of the Association for Computational Linguistics: Long Papers-Volume 1. Association for Computational Linguistics, 2012). In the example described above, the tagged corpus or training data is a set of messages in which each entity is assigned a binary label indicating whether the entity is related to the topic to be analyzed. However, in social media where various topics are created every day, it is not realistic to manually generate training data. It is thus necessary to develop a technique for automatically acquiring training data for disambiguation.

The publications D. Spina, et al., "Discovering Filter Keywords for Company Name Disambiguation in Twitter." Expert Systems with Applications 40.12 (2013): 4986-5003 and Z. Miklos, et al., "Entity-based classification of twitter messages." International Journal of Computer Science & Applications 9. EPFL-ARTICLE-174746 (2012): 88-115, disclose techniques for automatically acquire such training data. Specifically, the techniques disclosed in these publications use company websites and Wikipedia to acquire training data for disambiguation of ambiguous company names.

The publication of E. L. Murnane, et al., "RESLVE: leveraging user interest to improve entity disambiguation on short text." Proceedings of the 22nd international conference on World Wide Web companion. International World Wide Web Conferences Steering Committee, 2013, discloses a technique in which, for users who write articles for Wikipedia, an interest model is built to disambiguate entities included in messages sent via social media by the users.

Japanese Patent Application Publication No. 2003-22275 discloses a technique in which, upon receipt of a user's search request including a search term and a user's selection of a field that matches a search purpose, a document search is performed by referring to a field-specific co-occurrence term DB and adding one or more co-occurrence terms.

Japanese Patent Application Publication No. 2014-002653 discloses a technique in which morphemes acquired within a predetermined period are extracted as co-occurrence terms to identify, as a co-occurrence term, a morpheme that occurs in the same document as a search keyword.

Japanese Patent Application Publication No. 2014-032536 discloses a technique that extracts a document including a default topic tag from a plurality of documents, calculates a frequency of occurrence of a word in the extracted document, and extracts a document related to a topic from documents other than the document including the default topic tag by using the calculated frequency of occurrence.

The techniques disclosed in Spina, et al., Miklos, et al., and Murnane, et al. use external knowledge, such as Wikipedia. This means that these techniques are highly dependent on the extensiveness of the external knowledge. However, it is true that even Wikipedia, which is expected to serve as one of the most extensive knowledge sources, cannot fully cover information about entities which are generally unknown, and that it is not always easy to deal with the diversity of topics discussed in social media.

The technique disclosed in Japanese Patent Application Publication No. 2003-22275 registers a document that has been used or is determined to be usable, and extracts co-occurrence terms from the registered document. However, to allow the extracted co-occurrence terms to effectively function as training data for disambiguation, it is essential to register an associated field together with the document. This involves manual work and is costly. Moreover, the document that has been used often cannot fully cover information about entities which are generally unknown.

In the technique disclosed in Japanese Patent Application Publication No. 2014-002653, a morpheme that occurs in the same document as a search keyword is identified as a co-occurrence term. However, the search keyword is not always used in the sense intended in the document. Therefore, even if a morpheme occurring in the same document as the search keyword is extracted as a co-occurrence term, the extracted morpheme may not function as training data for disambiguation of the search keyword.

The technique disclosed in Japanese Patent Application Publication No. 2014-032536 uses the frequency of occurrence of a word in a document which includes a default topic tag indicating a topic, to extract a document related to the topic. However, for example, if the document includes only one default topic tag, the document may not necessarily be a document on the topic. This is more so if the only default topic tag included in the document has ambiguity. Therefore, a word that frequently occurs in a document including a default topic tag indicating a topic cannot be used as training data for disambiguation.

SUMMARY

In one aspect, a method for generating training data for disambiguation of an entity comprising a word or word string related to a topic to be analyzed includes acquiring, by a processor, sent messages each including at least one entity contained in a set of entities; organizing the acquired messages by user who is a message sender and acquiring sets of messages, the sets each containing messages sent by each user; identifying, from the acquired sets of messages organized by user, a set of messages including different entities contained in the set of entities, the different entities being greater than or equal to a first threshold value (positive integer greater than one) in number, and identifying a user corresponding to the identified set of messages as a hot user; receiving an instruction indicating an object entity to be disambiguated, the object entity being contained in the set of entities; determining a likelihood of co-occurrence of each keyword and the object entity in sets of messages sent by hot users, the keyword being included in messages each including the object entity, the messages being acquired; and determining training data for the object entity on the basis of the likelihood of co-occurrence of each keyword and the object entity in the sets of messages sent by the hot users.

In another aspect, a nontransitory, computer readable storage medium having computer readable instruction stored thereon that, when executed by a computer, implement method for generating training data for disambiguation of an entity comprising a word or word string related to a topic to be analyzed, the method including: acquiring, by a processor, sent messages each including at least one entity contained in a set of entities; organizing the acquired messages by user who is a message sender and acquiring sets of messages, the sets each containing messages sent by each user; identifying, from the acquired sets of messages organized by user, a set of messages including different entities contained in the set of entities, the different entities being greater than or equal to a first threshold value comprising a positive integer greater than one in number, and identifying a user corresponding to the identified set of messages as a hot user; receiving an instruction indicating an object entity to be disambiguated, the object entity being contained in the set of entities; determining a likelihood of co-occurrence of each keyword and the object entity in sets of messages sent by hot users, the keyword being included in messages each including the object entity, the messages being acquired; and determining training data for the object entity on the basis of the likelihood of co-occurrence of each keyword and the object entity in the sets of messages sent by the hot users.

In another aspect, a system for generating training data for disambiguation of an entity comprising a word or word string related to a topic to be analyzed, includes a processing device configured to: acquire sent messages, each including at least one entity contained in a set of entities; organize the acquired messages by user who is a message sender and acquiring sets of messages, the sets each containing messages sent by each user; identify, from the acquired sets of messages organized by user, a set of messages including different entities contained in the set of entities, the different entities being greater than or equal to a first threshold value comprising a positive integer greater than one in number, and identify a user corresponding to the identified set of messages as a hot user; receive an instruction indicating an object entity to be disambiguated, the object entity being contained in the set of entities; determine a likelihood of co-occurrence of each keyword and the object entity in sets of messages sent by hot users, the keyword being included in messages each including the object entity, the messages being acquired; and determine training data for the object entity on the basis of the likelihood of co-occurrence of each keyword and the object entity in the sets of messages sent by the hot users.

BRIEF DESCRIPTION OF THE DRAWINGS

FIG. 6 is a table showing a P/N score for each keyword when Tokyo motor show 2013 is used as a topic to be analyzed.

DETAILED DESCRIPTION

Figure 1:
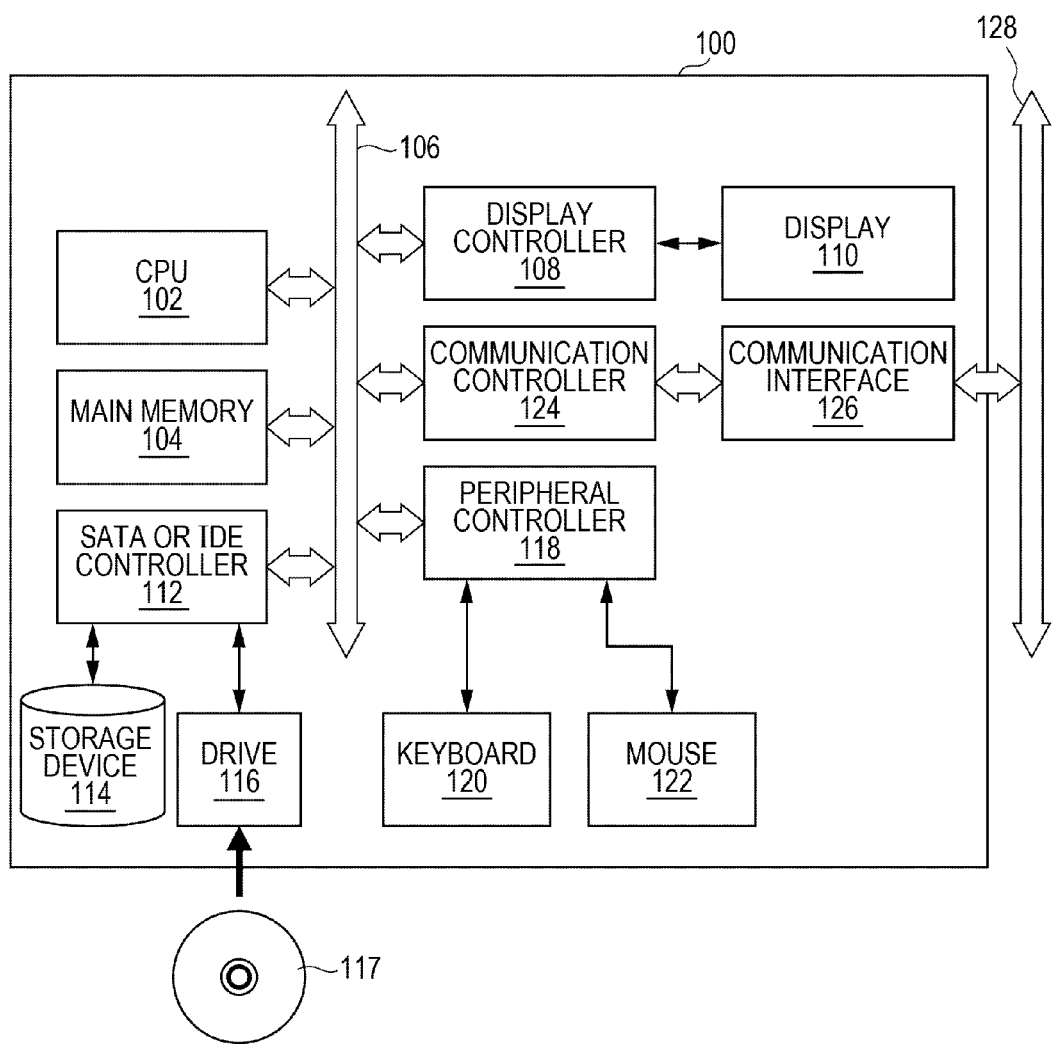
FIG. 1 illustrates a hardware configuration of an information processing apparatus suitable for implementing a training data generating system according to an embodiment.

Embodiments of the present invention have been made in view of the problems in the conventional techniques described above. An object of the present invention is to provide a method, system, and program for generating training data for disambiguation of entities. The method, system, and program to be provided are applicable to messages sent via media, such as social media, where various topics are created every day, and require no external knowledge.

Embodiments of the present invention provide a method having the following features to solve the problems of the conventional techniques described above. The method is for generating training data for disambiguation of an entity. The method for generating training data according to the present invention is performed by a computer and includes (a) acquiring sent messages each including at least one entity contained in a set of entities; (b) organizing the acquired messages by user who is a message sender and acquiring sets of messages, the sets each containing messages sent by each user; (c) identifying, from the acquired sets of messages organized by user, a set of messages including different entities contained in the set of entities, the different entities being greater than or equal to a first threshold value (positive integer greater than one) in number, and identifying a user corresponding to the identified set of messages as a hot user; (d) receiving an instruction indicating an entity to be disambiguated (hereinafter referred to as "object entity"), the object entity being contained in the set of entities; (e) determining a likelihood of co-occurrence of each keyword and the object entity in sets of messages sent by hot users, the keyword being included in messages each including the object entity, the messages being acquired in (a); and (f) determining training data for the object entity on the basis of the likelihood of co-occurrence of each keyword and the object entity in the sets of messages sent by the hot users.

Preferably, (e) includes calculating, as a score indicating a likelihood of co-occurrence of each keyword and the object entity in the sets of messages sent by the hot users, a value obtained by dividing a ratio of the number of hot users who sent messages including the object entity and the keyword to the total number of users who sent messages including the object entity and the keyword by a ratio of the number of hot users who sent messages including the object entity to the total number of users who sent messages including the object entity. Alternatively, (e) may include calculating, as a score indicating a likelihood of co-occurrence of each keyword and the object entity in the sets of messages sent by the hot users, pointwise mutual information about an event where a user who mentioned the object entity also mentioned the keyword and an event where a user who mentioned the object entity is a hot user.

More preferably, in (f), the score calculated for each keyword is compared with a second threshold value to determine whether the keyword is either positive or negative training data for the object entity.

Preferably, in (f), for each message including the object entity acquired in the (a), if a sum of scores of respective keywords included in the message is greater than a third threshold value, the message is determined to be positive training data for the object entity, whereas if the sum is smaller than a fourth threshold value, the message is determined to be negative training data for the object entity.

More preferably, in calculation of the sum, a weight is assigned to the score of each keyword in accordance with a frequency of concurrent occurrence of the keyword and the object entity.

Still more preferably, as the frequency of concurrent occurrence of the keyword and the object entity, the number of users who sent messages including the keyword and the object entity is used.

Preferably, (b) includes further organizing the acquired messages by period and acquiring sets of messages, the sets each containing messages sent by each user in each period; and (c) includes identifying, from the acquired sets of messages organized by user and period, a message including different entities contained in the set of entities, the different entities being greater than or equal to a fifth threshold value (positive integer greater than one) in number, and identifying a user who sent the identified message as a hot user in the period in which the message was sent.

More preferably, (e) includes calculating, as a score indicating a likelihood of co-occurrence of each keyword and the object entity in the sets of messages sent by the hot users, a value obtained by dividing a ratio of the number of hot users who sent messages including the object entity and the keyword in all periods included in a predetermined period to the total number of users who sent messages including the object entity and the keyword in the predetermined period by a ratio of the number of hot users who sent messages including the object entity in all periods included in the predetermined period to the total number of users who sent messages including the object entity in the predetermined period. Alternatively, (e) may include calculating, as a score indicating a likelihood of co-occurrence of each keyword and the object entity in the sets of messages sent by the hot users, pointwise mutual information about an event where a user who mentioned the object entity in a predetermined period also mentioned the keyword in the predetermined period and an event where a user who mentioned the object entity in the predetermined period is a hot user.

The present invention has been described as a method for generating training data for disambiguation of an object entity. The present invention may also be considered as a training data generating program for causing a computer to execute each operation of the method for generating training data, and as a training data generating system implemented by installing the training data generating program on a computer.

In the method configured as described above for generating training data for disambiguation, a user who frequently sends messages about a topic to be analyzed is identified as a hot user, and a likelihood of co-occurrence of each keyword and an object entity in sets of messages sent by hot users is calculated. On the basis of the calculated likelihood of co-occurrence, training data for disambiguation of the object entity is determined. In the present invention, training data is thus generated by using sets of messages sent by hot users. This requires no external knowledge and can cover information about entities which are generally unknown. Other advantageous effects of the present invention can be understood from the description of embodiments.

Embodiments for carrying out the present invention will now be described in detail on the basis of the drawings, but the following embodiments do not limit the invention set forth in the scope of claims. Also, not all combinations of features described in the embodiments are essential to the solving means of the invention. Throughout the description of the embodiments, the same elements are given the same reference numerals.

FIG. 1 illustrates a hardware configuration of a computer 100 for implementing the present invention. The computer 100 includes a CPU 102 and a main memory 104, which are connected to a bus 106. The CPU 102 is preferably based on a 32-bit or 64-bit architecture. The CPU 102 may be, for example, a Core (trademark) i-series, Core (trademark) 2 series, Atom (trademark) series, Xeon (registered trademark) series, Pentium (registered trademark) series, or Celeron (registered trademark) series processor from Intel Corporation; an A-series, Phenom (trademark) series, Athlon (trademark) series, Turion (trademark) series, or Sempron (trademark) processor from Advanced Micro Devices (AMD) Inc.; or a Power (trademark) series processor from International Business Machines Corporation.

A display 110, such as a liquid crystal display (LCD), can be connected via a display controller 108 to the bus 106. The liquid crystal display may be, for example, a touch panel display or a floating touch display. The display 110 can be used to display, via an appropriate graphical interface, information (e.g., training data) that can be displayed by operation of software (e.g., computer program according to the present embodiment) running on the computer 100.

A storage device 114, such as a hard disk drive (HDD), and a drive 116, such as a CD, DVD, or BD drive, can be optionally connected to the bus 106, for example, via an SATA or IDE controller 112.

A keyboard 120 and a mouse 122 can be optionally connected to the bus 106 via a peripheral controller 118, such as a keyboard/mouse controller or a USB bus.

The storage device 114 can store an operating system, such as Windows (registered trademark) OS, UNIX (registered trademark), or Mac OS (registered trademark); the computer program according to the present embodiment and other programs; and data, in such a manner that they can be loaded into the main memory 104.

The storage device 114 may be included in the computer 100, may be connected via a cable to the computer 100 such that the storage device 114 can be accessed by the computer 100, or may be connected via a wired or wireless network to the computer 100 such that the storage device 114 can be accessed by the computer 100.

The drive 116 can be used to install a computer program, such as an operating system or an application, from a CD-ROM, DVD-ROM, or BD 117, onto the storage device 114 as necessary. The computer program may be compressed, or may be divided into a plurality of pieces and stored in a plurality of media.

A communication interface 126 complies with, for example, the Ethernet (registered trademark) protocol. The communication interface 126 is connected via a communication controller 124 to the bus 106, and allows wired or wireless connection of the computer 100 to a communication line 128. The communication interface 126 provides a network interface layer for the TCP/IP communication protocol for the communication function of the operating system in the computer 100. The communication line 128 may be, for example, a wired LAN environment based on a wired LAN connection standard or a wireless LAN environment based on a wireless LAN connection standard. Examples of the wireless LAN environment include a Wi-Fi wireless LAN environment, such as IEEE802.11a/b/g/n, and a mobile phone network environment (e.g., 3G or 4G (including LTE) environment).

The computer 100 can receive data from other computers via the communication line 128 and store the received data in the storage device 114.

From the above description, it can be easily understood that the computer 100 can be implemented by an information processing apparatus, such as a typical personal computer, a workstation, or a mainframe, or by a combination of these devices. Note that components described above are merely examples, and not all the components are essential to the present invention. Also, it is obvious that the computer 100 for implementing the present invention may include components such as a speaker and others.

Figure 2:
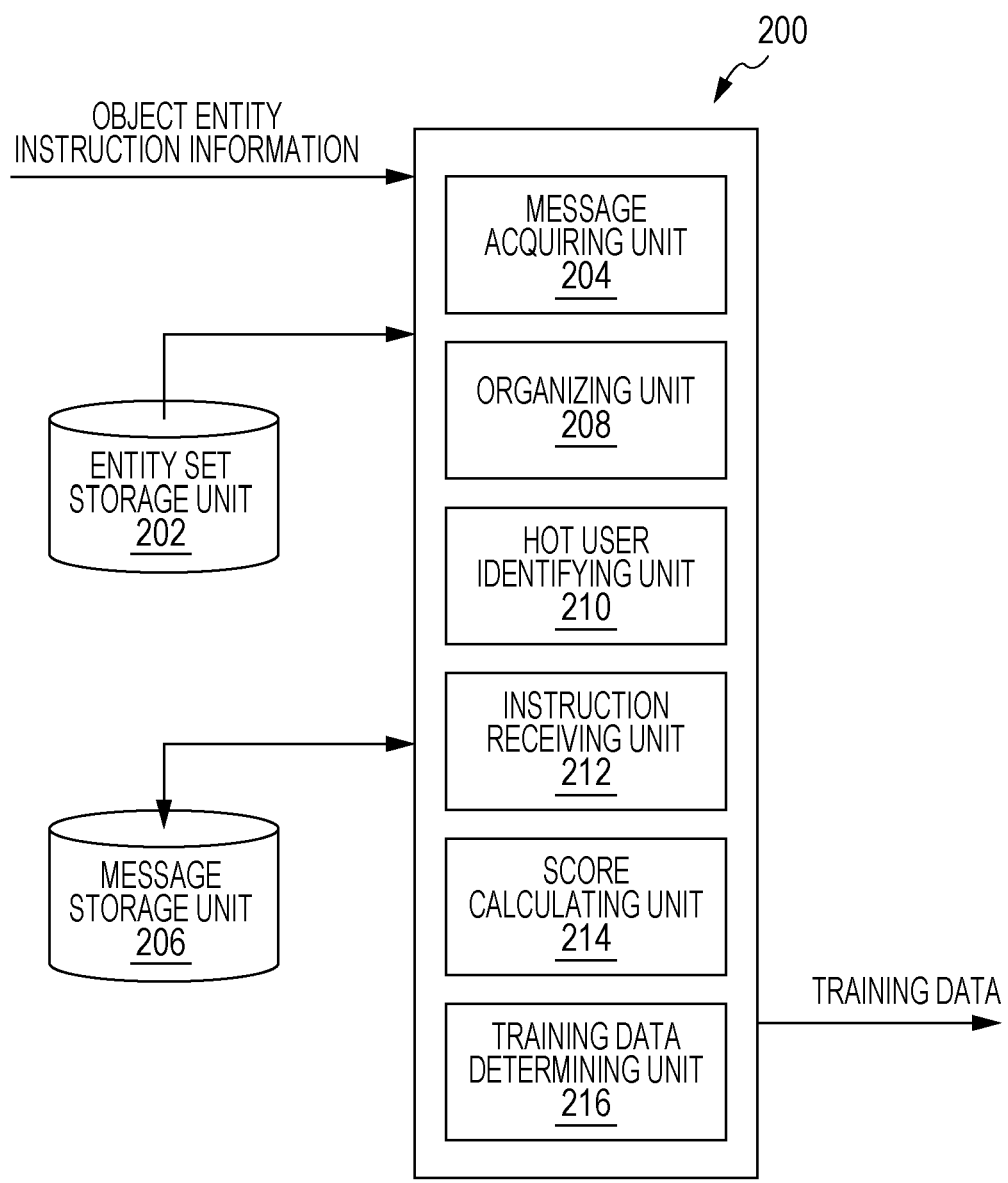
FIG. 2 is a functional block diagram of the training data generating system according to the embodiment.

FIG. 2 is a functional block diagram of a training data generating system 200 according to the present embodiment. By using a set of entities for a topic to be analyzed as an input, the training data generating system 200 discovers users who frequently send messages about the topic to be analyzed, identifies keywords which are likely or unlikely to co-occur with an object entity in a set of messages sent by the users, and thus automatically acquires training data for the object entity. The training data generating system 200 includes an entity set storage unit 202, a message acquiring unit 204, a message storage unit 206, an organizing unit 208, a hot user identifying unit 210, an instruction receiving unit 212, a score calculating unit 214, and a training data determining unit 216. The entity set storage unit 202 and the message storage unit 206 may be physically either a single storage unit or a plurality of storage units. Each component of the training data generating system 200 will now be described.

The entity set storage unit 202 stores a set of entities which are words or word strings related to a topic to be analyzed. For example, if the topic to be analyzed is "Tokyo motor show 2013", the names of exhibitors and cars on display may be set as entities in the set of entities, by reference to event websites and guide books. If the topic to be analyzed is "Kyoto", sightseeing spots, such as Kiyomizu-dera, Kinkaku-ji, and Kamo River, may be set as entities in the set of entities by reference to guide books. The set of entities may be manually created, or may be created using an existing search query extension method or the like. To simplify the following explanation, an entity set for a topic to be analyzed will be indicated by a symbol E, and an entity which is an element of the entity set E will be indicated by a symbol e (e∈E).

The message acquiring unit 204 reads an entity set E from the entity set storage unit 202, and acquires messages sent by users and each including at least one of entities e contained in the entity set E. Preferably, the message acquiring unit 204 acquires messages sent within a predetermined period by users and each including at least one of entities e contained in the entity set E. Messages acquired by the message acquiring unit 204 are preferably real-time messages sent via a social media tool, such as microblogging, but are not limited thereto. Messages acquired by the message acquiring unit 204 may be other information, such as traditional blog articles, sent by users.

The message acquiring unit 204 may acquire messages by using an API provided by each service, or may acquire messages directly from service providers. The message acquiring unit 204 may acquire authorized messages by using a web crawler. As additional information, messages each contain metadata, including user information for identifying a message sender and time information indicating the time when the message was sent. If no metadata exists and user information is included in message text in a predetermined format, the message acquiring unit 204 may extract the user information from the message text using string matching in accordance with the predetermined format. The message acquiring unit 204 stores the acquired messages in the message storage unit 206.

The organizing unit 208 reads messages from the message storage unit 206, organizes the read messages by user on the basis of metadata, and creates a message set for each user. Preferably, the organizing unit 208 further organizes messages in the message set for each user by period on the basis of the metadata. Then, the organizing unit 208 performs a morphological analysis of each message, and creates a set of entities e included in the message and a set of keywords which are any words or word strings included in the message. To simplify the following explanation, a message acquired by the message acquiring unit 204 is indicated by a symbol $m=(u_m, t_m, E_m, W_m)$. The meaning of each symbol is as follows:

U: a set of users who sent messages collected by the message acquiring unit 204;

$D_i$: a collection period $D_1, D_2, \ldots, D_n$ ($D_i=[t_i, t_i+\delta)$, $t_{i+1}=t_i+\delta$), where $\delta$ is a parameter indicating the length of a period;

$u_m$: a user who sent the message m ($u_m \in U$);

$t_m$: a time when the message m was sent ($t_m \in D_i$);

$E_m$: a set of entities included in the message m ($E_m \in E$); and $W_m$: a set of keywords included in the message m.

The messages m organized by the organizing unit 208 are stored in the message storage unit 206 again.

For a set of messages sent by each user u and stored in the message storage unit 206, the hot user identifying unit 210 determines a set $E(u, D_i)$ of entities e included in a set of messages sent in a period $D_i$ by the user u. Then, the hot user identifying unit 210 identifies $E(u, D_i)$ in which the number of different entities e is greater than or equal to a threshold value θ (θ is a positive integer greater than one), and identifies the user u corresponding to the identified $E(u, D_i)$ as a hot user. A hot user in the period $D_i$ is a user who mentioned θ or more entities e in the period $D_i$ and who frequently sends messages about the topic to be analyzed. In the following description, a hot user for a topic to be analyzed in the period $D_i$ will be indicated by a symbol $U_{hot}(D_i)$, which can be expressed as $U_{hot}(D_i)=\{u\in U | |E(u, D_i)|\geq\theta\}$. Information about the hot user identified by the hot user identifying unit 210 is passed to the score calculating unit 214 (described below).

The instruction receiving unit 212 receives an instruction from a user via an input device (e.g., the keyboard 120 or the mouse 122 in FIG. 1) or by reading it from a storage device (e.g., the storage device (HDD) 114 or the CD-ROM, DVD-ROM, or BD 117 in FIG. 1). Of entities e contained in an entity set E, an entity to be disambiguated (hereinafter referred to as "object entity $e_o$") is indicated by the instruction. The instruction indicating the object entity $e_o$ may be received from a remote computer via a communication interface (e.g., the communication interface 126 in FIG. 1). Information about the object entity $e_o$ received by the instruction receiving unit 212 is passed to the score calculating unit 214 (described below).

The score calculating unit 214 calculates a P/N score, PNscore($e_o$, w), indicating a likelihood of co-occurrence of the object entity $e_o$ and each keyword w in messages sent by hot users. Here, the keyword w is any word or word string in messages including the object entity $e_o$ and acquired by the message acquiring unit 204. The score calculating unit 214 calculates the P/N score for the following reason. That is, the object entity $e_o$ occurring in messages sent by hot users having a strong interest in the topic to be analyzed is expected to be used in the context of the topic to be analyzed. Therefore, a keyword w which is likely to co-occur with the object entity $e_o$ in messages sent by hot users can be used as positive training data for disambiguation of the object entity $e_o$. Conversely, a keyword w which is unlikely to co-occur with the object entity $e_o$ can be used as negative training data for disambiguation of the object entity $e_o$. In the present invention, a P/N score for each keyword w is calculated as an index for determining the applicability of the keyword w as positive training data and negative training data for the object entity $e_o$. A method for calculating PNscore($e_o$, w) will now be described.

First, the score calculating unit 214 calculates, in the following manner, a user set $U(D_i, e_o)$ and a hot user set $U_{hot}(D_i, e_o)$ which are sets of users and hot users who sent messages including the object entity $e_o$ in the period $D_i$:

$$U(D_i, e_o) = \{u \in U | \exists m(u, t_m, E_m, W_m), t_m \in D_i \hat{} e_o \in E_m\} \quad (1)$$

$$U_{hot}(D_i, e_o) = \{u \in U_{hot}(D_i) | \exists m(u, t_m, E_m, W_m), t_m \in D_i \hat{} e_o \in E_m\} \quad (2)$$

The score calculating unit 214 divides the sum of the total numbers of hot users in hot user sets, each represented by $U_{hot}(D_i, e_o)$ in equation (2), in all periods included in a message collection period by the sum of the total numbers of users in user sets, each represented by $U(D_i, e_o)$ in equation (1), in all the periods included in the collection period to calculate the ratio $\text{ratio}_{hot}(e_o)$ of the total number of hot users who sent messages including the object entity $e_o$ in all the periods to the total number of users who sent messages including the object entity $e_o$ in all the periods:

$$\text{ratio}_{hot}(e_o) = \Sigma_{Di} |U_{hot}(D_i, e_o)| / \Sigma_{Di} |U(D_i, e_o)| \quad (3)$$

The score calculating unit 214 also calculates, in the following manner, a user set $U(D_i, e_o, w)$ and a hot user set $U_{hot}(D_i, e_o, w)$ which are sets of users and hot users who sent messages including the object entity $e_o$ and a keyword w in the period $D_i$:

$$U(D_i, e_o, w) = \{u \in U | \exists m(u, t_m, E_m, W_m), t_m \in D_i \hat{} e_o \in \hat{} w \in W_m\} \quad (4)$$

$$U_{hot}(D_i, e_o, w) = \{u \in U_{hot}(D_i) | \exists m(u, t_m, E_m, W_m), t_m \in D_i \hat{} e_o \in \hat{} E_m \hat{} w \in W_m\} \quad (5)$$

The score calculating unit 214 divides the sum of the total numbers of hot users in hot user sets, each represented by $U_{hot}(D_i, e_o, w)$ in equation (5), in all the periods included in the message collection period by the sum of the total numbers of users in user sets, each represented by $U(D_i, e_o, w)$ in equation (4), in all the periods included in the collection period to calculate the ratio $\text{ratio}_{hot}(e_o, w)$ of the total number of hot users who sent messages including the object entity $e_o$ and the keyword w in all the periods to the total number of users who sent messages including the object entity $e_o$ and the keyword w in all the periods:

$$\text{ratio}_{hot}(e_o, w) = \Sigma_{Di} |U_{hot}(D_i, e_o, W)| / \Sigma_{Di} |U(D_i, e_o, w)| \quad (6)$$

Finally, the score calculating unit 214 uses $\text{ratio}_{hot}(e_o)$ represented by equation (3) and $\text{ratio}_{hot}(e_o, w)$ represented by equation (6) to calculate, in the following manner, a score PNscore($e_o$, w) indicating the likelihood of co-occurrence of the object entity $e_o$ and the keyword w:

$$PN\text{score}(e_o, w) = \text{ratio}_{hot}(e_o, w) / \text{ratio}_{hot}(e_o) \quad (7)$$

The P/N score thus calculated is greater than one if the keyword w is more likely to co-occur with the object entity $e_o$ in messages sent by hot users, and is smaller than one if the keyword w is less likely to co-occur with the object entity $e_o$ in messages sent by hot users. The P/N score for each keyword w calculated by the score calculating unit 214 is passed to the training data determining unit 216 (described below).

The P/N score may be a score based on pointwise mutual information (PMI). When x is an event where a user who mentioned the object entity $e_o$ also mentioned the keyword w and y is an event where a user who mentioned the object entity $e_o$ is a hot user, the P/N score may be defined by the following equation:

$$PN\text{score}(e_o, w) = PMI(x, y) = \log(Pr(x, y) / Pr(x) Pr(y)) \quad (8)$$

where $$Pr(x) = \Sigma_{Di} |U(D_i, e_o, w)| / \Sigma_{Di} |U(D_i, e_o)| \quad (9)$$

$$Pr(y) = \Sigma_{Di} |U_{hot}(D_i, e_o)| / \Sigma_{Di} |U(D_i, e_o)| \quad (10)$$

$$Pr(x, y) = \Sigma_{Di} |U_{hot}(D_i, e_o, w)| / \Sigma_{Di} |U(D_i, e_o)| \quad (11)$$

The P/N score thus calculated is greater than zero if the keyword w is more likely to co-occur with the object entity $e_o$ in messages sent by hot users, and is smaller than zero if the keyword w is less likely to co-occur with the object entity $e_o$ in messages sent by hot users.

The P/N score will now be concretely described with reference to FIGS. 3(a) and 3(b). In the example shown in FIGS. 3(a) and 3(b), the topic to be analyzed is "Tokyo motor show 2013" and the object entity $e_o$ to be disambiguated is the word "Jaguar". The word "Jaguar" is used in multiple senses. For example, the word "Jaguar" may be used in the context of feline mammals, or may be used in the context of car brand names. Since the topic to be analyzed is "Tokyo motor show 2013" here, the P/N score is expected to be higher for a word which is more likely to co-occur with the word "Jaguar" used in the context of car brand names, and lower for a word which is less likely to co-occur with the word "Jaguar" used in the context of car brand names.

Figure 3A:
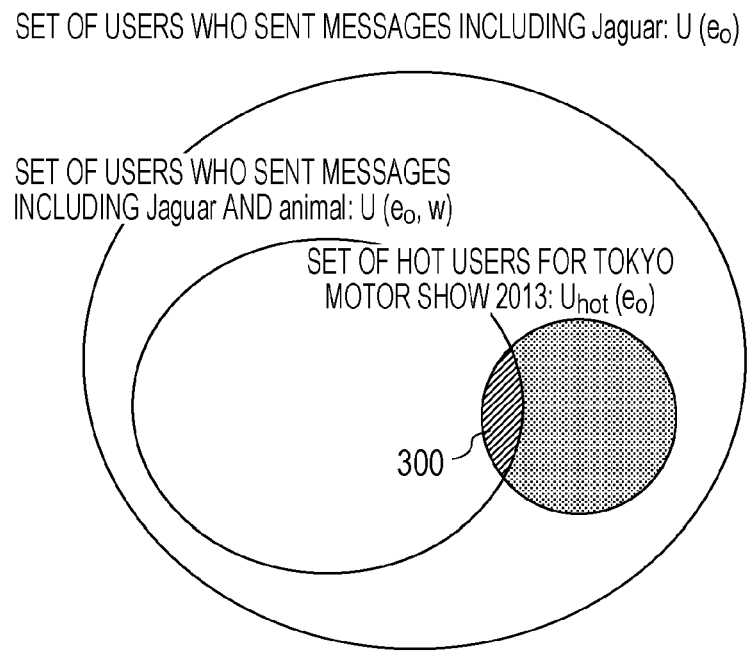
FIG. 3(a) is a diagram explaining the meanings of values necessary for calculating a P/N score indicating the likelihood of co-occurrence of an entity and a keyword.

FIG. 3(a) illustrates an inclusion relation between a set of users U($e_o$) who sent messages including the word "Jaguar", a set of users U($e_o$, w) who sent messages including the word "Jaguar" and the word "animal", and a set of hot users $U_{hot}(e_o)$ for the topic to be analyzed "Tokyo motor show 2013". As illustrated in FIG. 3(a), only a few users in the set of hot users $U_{hot}(e_o)$ sent messages including the word "Jaguar" and the word "animal" (see region 300). Therefore, the value of PNscore($e_o$, w) represented by the following equation (12) is smaller than one, and the value of PNscore $(e_o, w)$ represented by equation (8) is smaller than zero. This shows that in messages sent by hot users, the word "animal" is less likely to co-occur with the word "Jaguar".

Expression 1

$$PNscore(e_o, w) = \frac{|U(e_o, w) \cap U_{hot}(e_o)|}{|U(e_o, w)|} \bigg/ \frac{|U_{hot}(e_o)|}{|U(e_o)|} \quad (12)$$

In equation (12), a parameter indicating a period is omitted to simplify the explanation. The P/N score represented by equation (12) is smaller than one, and the P/N score represented by equation (8) is smaller than zero. This shows that the word "animal" can be used as negative training data for the word "Jaguar".

Figure 3B:
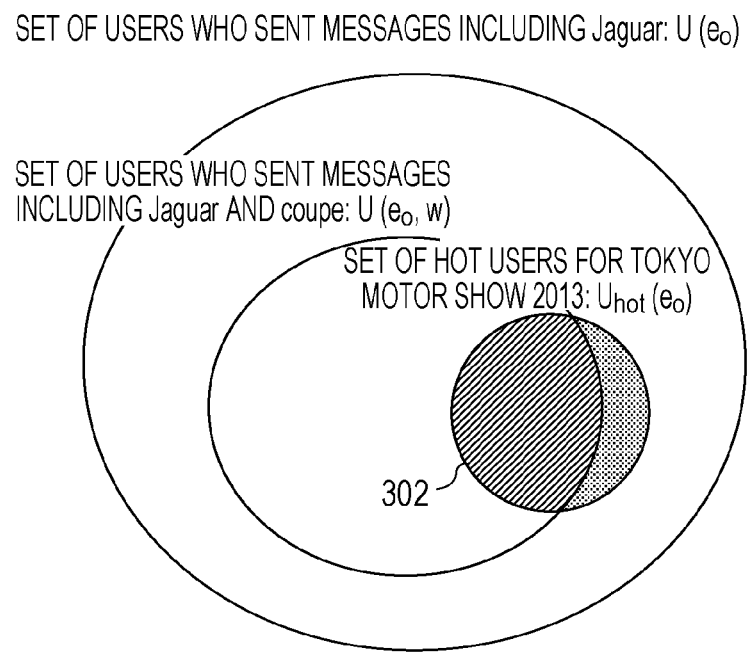
FIG. 3(b) is another diagram explaining the meanings of values necessary for calculating a P/N score indicating the likelihood of co-occurrence of an entity and a keyword.

FIG. 3(b) illustrates an inclusion relation between a set of users $U(e_o)$ who sent messages including the word "Jaguar", a set of users $U(e_o, w)$ who sent messages including the word "Jaguar" and the word "coupe", and a set of hot users $U_{hot}(e_o)$ for the topic to be analyzed "Tokyo motor show 2013". As illustrated in FIG. 3(b), many hot users sent messages including the word "Jaguar" and the word "coupe" (see region 302). Therefore, the value of PNscore($e_o$, w) represented by equation (12) is greater than one, and the value of PNscore($e_o$, w) represented by equation (8) is greater than zero. This shows that in messages sent by hot users, the word "coupe" is more likely to co-occur with the word "Jaguar". The large P/N score shows that the word "coupe" can be used as positive training data for the word "Jaguar".

The training data determining unit 216 determines training data for the object entity $e_o$ on the basis of the P/N score calculated by the score calculating unit 214. Specifically, if the P/N score calculated for each keyword w is greater than one in the case of using equation (7) or greater than zero in the case of using equation (8), the training data determining unit 216 can determine the keyword w as positive training data for the object entity $e_o$. Also, if the P/N score calculated for each keyword w is smaller than one in the case of using equation (7) or smaller than zero in the case of using equation (8), the training data determining unit 216 can determine the keyword w as negative training data for the object entity $e_o$.

Alternatively, the training data determining unit 216 may determine positive and negative training data for each message including the object entity $e_o$ acquired by the message acquiring unit 204. Specifically, if the sum of P/N scores of respective keywords w included in the message is greater than a threshold value tip, the training data determining unit 216 may determine the message as positive training data for the object entity $e_o$. Also, if the sum of P/N scores described above is smaller than a threshold value tin, the training data determining unit 216 may determine the message as negative training data for the object entity $e_o$.

Additionally, when calculating the sum of P/N scores of respective keywords w for each message, the training data determining unit 216 may assign a weight to the P/N score of each keyword w in accordance with the frequency of concurrent occurrence of the keyword w and the object entity $e_o$ as in the following equation (13):

Expression 2

$$PNscore(e_o, m) = \sum_{w \in W_m} PNscore(e_o, w) \times Weight(e_o, w) \quad (13)$$

As in the following expression (14), the number of users who sent messages including the keyword w and the object entity $e_o$ may be used as the frequency of concurrent occurrence of the keyword w and the object entity $e_o$:

Expression 3

$$Weight(e_o, w) \propto \Sigma_{D_i} |U(D_i, e_o, w)| \quad (14)$$

Information of the training data determined by the training data determining unit 216 is used to disambiguate the object entity $e_o$. A framework of existing supervised document classification, such as a naive Bayes classifier or a support vector machine, may be used to disambiguate the object entity $e_o$. These techniques are not described in detail in the present specification, as they are known techniques out of the scope of the present invention.

Information of the training data determined by the training data determining unit 216 may itself be used as a result obtained by disambiguating the object entity $e_o$. That is, positive training data may be used as an entity related to the topic to be analyzed, and negative training data may be used as an entity not related to the topic to be analyzed.

Figure 4:
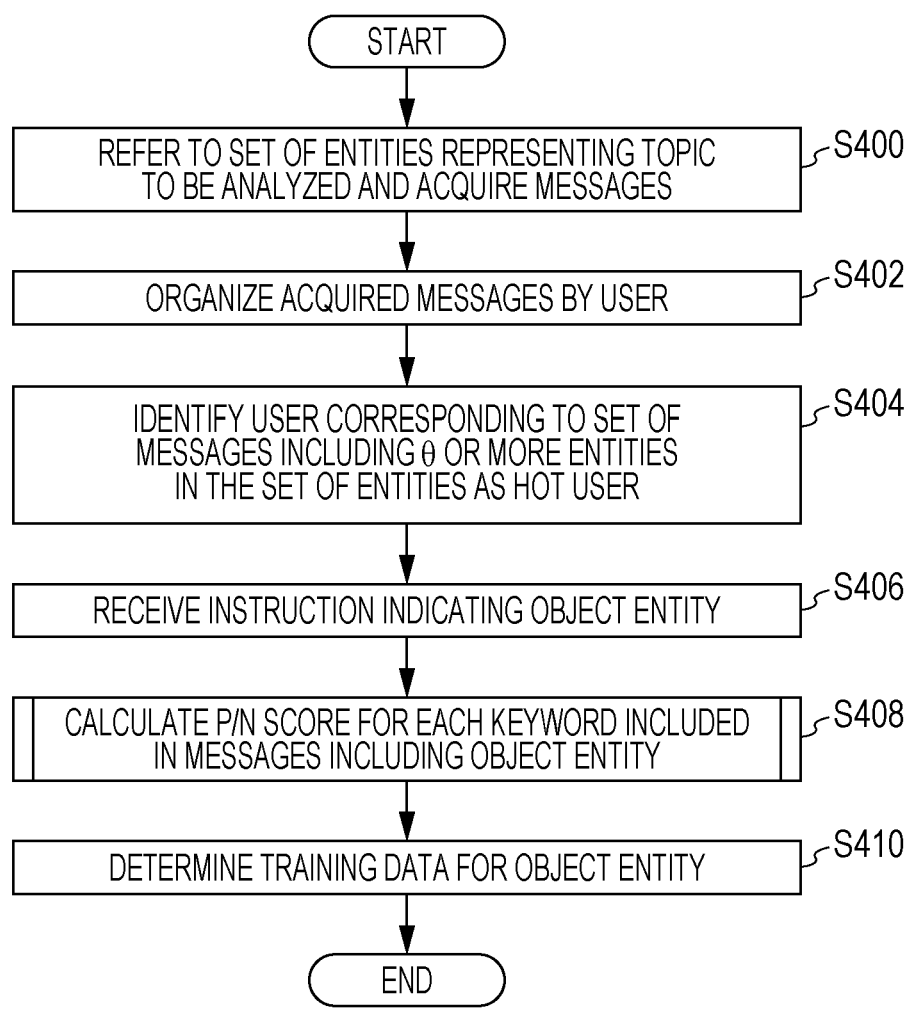
FIG. 4 is a flowchart illustrating a flow of training data generation according to the embodiment.

A flow of training data generation carried out by the training data generating system 200 according to the present embodiment will now be described with reference to FIG. 4. The process of training data generation starts at operation S400. In operation S400, the message acquiring unit 204 refers to an entity set E stored in the entity set storage unit 202 and containing entities representing a topic to be analyzed, acquires messages sent within a predetermine period and each including at least one entity e in the entity set E, and stores the messages in the message storage unit 206.

Next, on the basis of metadata acquired with the messages, the organizing unit 208 organizes the messages acquired by the message acquiring unit 204 by user u and period $D_i$ (operation S402). Next, for a set of messages corresponding to each user u and period $D_i$ organized by the organizing unit 208, the hot user identifying unit 210 determines a set $E(u, D_i)$ of entities included in messages in the set. Then, the hot user identifying unit 210 identifies, as a hot user in a period $D_i$, a user u corresponding to a message set in which the number of included entities $|E(u, D_i)|$ is greater than or equal to θ (operation S404).

Next, the instruction receiving unit 212 receives an instruction indicating an object entity $e_o$ from a user (operation S406). Then, the score calculating unit 214 calculates a P/N score for each keyword w included in messages each including the object entity $e_o$ (operation S408). The operation performed by the score calculating unit 214 will be described in detail later on with reference to FIG. 5. Last, on the basis of the P/N score calculated for each keyword w by the score calculating unit 214, the training data determining unit 216 determines positive and negative training data for the object entity $e_o$ (operation S410). Then, the process ends.

Figure 5:
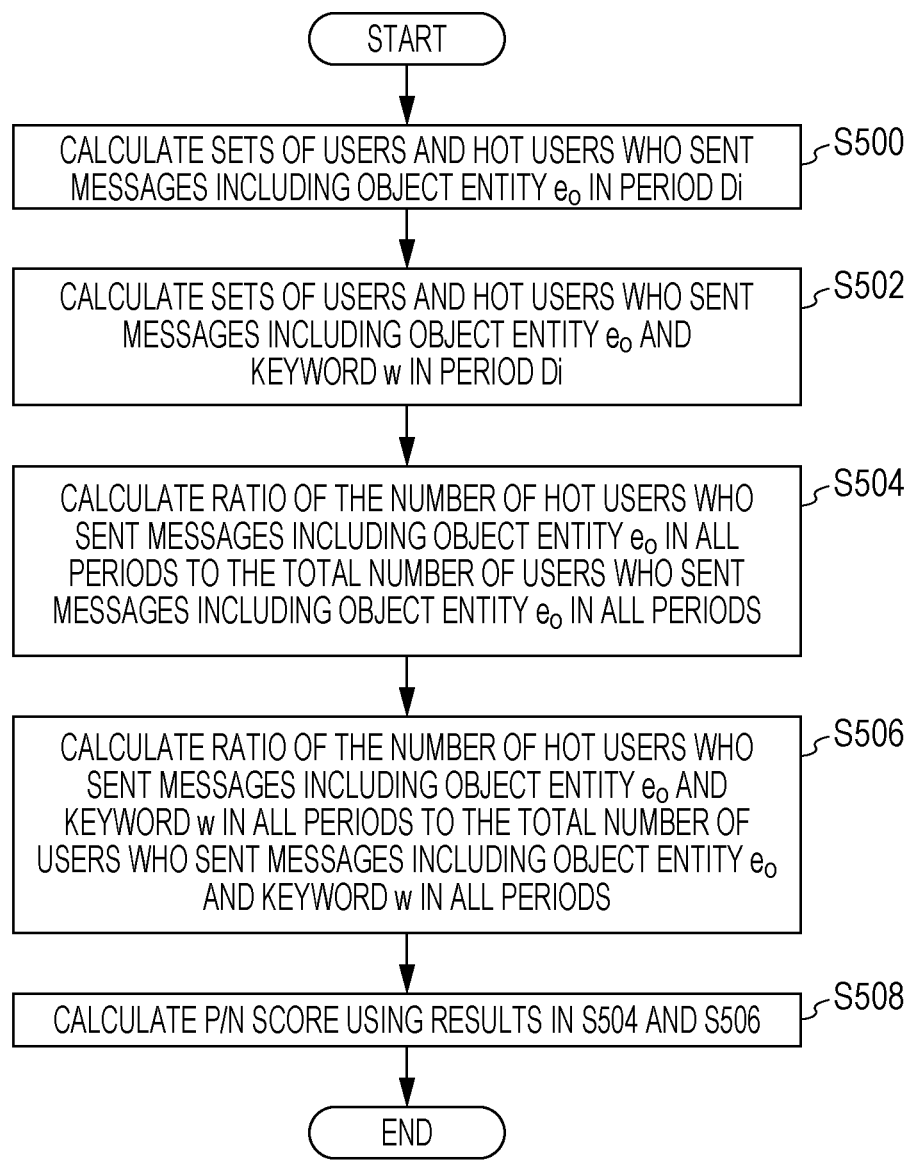
FIG. 5 is a flowchart illustrating a flow of operation S408 in the flowchart of FIG. 4.

A flow of score calculation done by the score calculating unit 214 will now be described with reference to FIG. 5. The process of score calculation starts at operation S500, where the score calculating unit 214 calculates a set $U(D_i, e_o)$ of users who sent messages including the object entity $e_o$ in the period $D_i$ and a set $U_{hot}(D_i, e_o)$ of hot users who sent messages including the object entity $e_o$ in the period $D_i$.

Next, the score calculating unit 214 calculates a set of users $U(D_i, e_o, w)$ who sent messages including the object entity $e_o$ and the keyword w for which the P/N score is to be calculated in the period $D_i$, and also calculates a set of hot users $U_{hot}(D_i, e_o, w)$ who sent messages including the object entity $e_o$ and the keyword w in the period $D_i$ (operation S502).

Next, the score calculating unit 214 calculates a ratio $ratio_{hot}(e_o)$ of the total number of hot users who sent messages including the object entity $e_o$ in all periods to the total number of users who sent messages including the object entity $e_o$ in all the periods (operation S504). Next, the score calculating unit 214 calculates a ratio $ratio_{hot}(e_o, w)$ of the total number of hot users who sent messages including the object entity $e_o$ and the keyword w for which the P/N score is to be calculated in all the periods to the total number of users who sent messages including the object entity $e_o$ and the keyword w in all the periods (operation S506).

Last, the score calculating unit 214 divides the value $ratio_{hot}(e_o, w)$ determined in operation S506 by the value $ratio_{hot}(e_o)$ determined in operation S504 to obtain the P/N score ($ratio_{hot}(e_o, w)/ratio_{hot}(e_o)$) for the keyword w (operation S508). Then the process ends.

An evaluation experiment for a P/N score proposed by the present invention will now be described with reference to FIG. 6. The content of the evaluation experiment to be described with reference to FIG. 6 is as follows:
topic to be analyzed: Tokyo motor show 2013;
entity set E: 147 names of exhibitors and cars on display are set by reference to event websites and guide books;
social media service: Twitter;
data collection period: Nov. 22, 2013 to Dec. 1, 2013 (10 days, same as the event period); and
parameters set by the proposed technique:
length of period δ=24 hours
threshold value θ for hot user determination=3.

For calculation of the P/N score, the following noises were eliminated from the collected data:
non-Japanese tweets;
retweets;
tweets containing external URLs; and
bot users.

Tweets containing external URLs were eliminated to exclude advertisements. Messages containing URLs for photo-sharing services and location-based services were not eliminated, because they often include descriptions of user experiences. Users who sent exactly the same message more than once in the past were identified as bot users.

The table in FIG. 6 shows examples of keywords for the object entity "Jaguar" and their P/N scores (calculated by equation (7)). The field on the right side of the table shows meanings of the object entity in actual messages. The table in FIG. 6 shows that keywords having P/N scores greater than one are used in the context of Tokyo motor show and thus can be used as positive training data for the object entity "Jaguar". The table in FIG. 6 also shows that keywords having P/N scores smaller than one are used in the context of music or animals unrelated to Tokyo motor show and thus can be used as negative training data for the object entity "Jaguar".

Although the present invention has been described using the embodiments, the technical scope of the present invention is not limited to the scope described in the embodiments. It is apparent to those skilled in the art that various modifications or improvements can be made to the embodiments described above. Therefore, it is obvious that such modified or improved embodiments may also be included in the technical scope of the present invention.

It should be noted that the order of execution of processing, such as operations, procedures, steps, and stages, in the apparatus, system, program, and method described in the scope of claims, description, and drawings is not specified with such terms as "before" and "prior to", and that the processing may be implemented in any order, unless the output of previous processing is used in subsequent processing. It should also be noted that even if the output of previous processing is used in subsequent processing, it may be possible to add other processing between the previous processing and the subsequent processing, or even if other processing is described as being added therebetween, it may still be possible to perform the previous processing immediately before the subsequent processing. Even if terms such as "first", "next", and "subsequently" may be used for convenience in the scope of claims, description, and operation flows in the drawings, this does not necessarily mean that it is essential to implement the processing in this order.

The invention claimed is:

1. A method for generating training data for disambiguation of an entity comprising a word or word string related to a topic to be analyzed, the method comprising:
communicating, by a processor, with a message server via an application programming interface of the message server;
acquiring, in real-time, by the processor, from the message server, a plurality of electronic messages each including at least one entity from a set of entities related to the topic to be analyzed;
identifying, by the processor, a user that sent each of the electronic messages based on metadata of the respective electronic messages and associating the electronic messages with respective sets from a plurality of sets of messages, each of the sets containing electronic messages sent by a respective user;
identifying, by the processor, from the sets of messages, a set of messages that includes a number of entities greater than or equal to a first threshold value, the first threshold value being a positive integer greater than one in number, and identifying the user corresponding to the identified set of messages as a hot user;
receiving, by the processor, an instruction indicating an object entity to be disambiguated, the object entity being an entity from the set of entities, and disambiguating the object entity comprises identifying a use of the object entity in association with the topic to be analyzed;
determining, by the processor, a likelihood of co-occurrence of a keyword and the object entity in a single electronic message from the set of messages sent by the hot user, the keyword being one of a plurality of terms included in the electronic message that is sent by the hot user and that includes the object entity; and
generating, by the processor, training data for the object entity on the basis of the likelihood of co-occurrence of the keyword and the object entity in a single electronic message sent by the hot user, wherein the training data identifies that co-occurrence of the keyword and the object entity in a single electronic message is indicative of a use of the object entity in relation to the topic to be analyzed.

2. The method of claim 1, wherein the method further comprises:
computing a first ratio of a number of hot users that sent electronic messages including the object entity and the keyword, and a total number of users who sent electronic messages including the object entity and the keyword;

computing a second ration of a number of hot users that sent messages including the object entity to a total number of users who sent messages including the object entity; and computing a score indicating a likelihood of co-occurrence of each keyword and the object entity in the identified sets of messages sent by the hot users, by dividing the first ratio by the second ratio.

3. The method of claim 1, wherein the method further comprises computing a score indicating a likelihood of co-occurrence of each keyword and the object entity in the sets of messages sent by the hot users, pointwise mutual information about an event where a user who mentioned the object entity also mentioned the keyword and an event where a user who mentioned the object entity is a hot user.

4. The method of claim 2, wherein, the score for each keyword is compared with a second threshold value to determine whether the keyword is either positive or negative training data for the object entity.

5. The method of claim 2, wherein, in response to a sum of scores of all keywords from an electronic message being greater than a third threshold value, the electronic message is determined to be positive training data for the object entity, and in response to the sum being smaller than a fourth threshold value, the electronic message is determined to be negative training data for the object entity.

6. The method of claim 5, wherein, a weight is assigned to the score of each keyword in accordance with a frequency of concurrent occurrence of the keyword and the object entity.

7. The method of claim 6, wherein the weight corresponding to a keyword is the number of users that sent electronic messages including the keyword and the object entity.

8. The method of claim 1, wherein the method further comprises:
   identifying, based on the metadata of the electronic messages, a sending period in which the messages are sent, and associating each of the electronic messages with respective sets of messages, wherein each of the sets contains messages sent by a respective user in a respective period;
   identifying, from the sets of messages, which organize the messages according to the user and the sending period, a message that includes a number of entities from the set of entities, the number of entities being greater than or equal to a fifth threshold value, wherein the fifth threshold value is a positive integer greater than one in number; and
   designating the user that sent the message as the hot user in the period in which the message was sent.

9. The method of claim 8, wherein the method further comprises:
   computing a first ratio of a number of hot users that sent electronic messages including the object entity and the keyword in a predetermined period and a total number of users who sent electronic messages including the object entity and the keyword in the predetermined period;
   computing a second ratio of a number of hot users that sent electronic messages including the object entity in the predetermined period to a total number of users who sent electronic messages including the object entity in the predetermined period; and
   computing a score indicating a likelihood of co-occurrence of each keyword and the object entity in the identified sets of messages sent by the hot users, by dividing the first ratio by the second ratio.

10. The method of claim 1, wherein the electronic messages are social media messages.

11. The method of claim 1, wherein the electronic messages are microblogging messages.

12. The method of claim 1, further comprising training a support vector machine using the training data to filter the electronic messages that are related to the topic to be analyzed.

13. The method of claim 1, further comprising training a Bayesian classifier using the training data to filter the electronic messages that are related to the topic to be analyzed.

* * * * *